Patented Dec. 22, 1942

2,306,139

UNITED STATES PATENT OFFICE 2,306,139

POLYMERIZATION OF UNSATURATED ALCOHOL ESTERS OF CROTONIC ACID

Maxwell A. Pollack, Akron, Ohio, assignor to Pittsburgh Plate Glass Company, Allegheny County, Pa., a corporation of Pennsylvania No Drawing. Application February 18, 1939, Serial No. 257,136

8 Claims. (Cl. 260—80)

This invention relates to resinous products and to the manufacture of such products. In accordance with my invention, I have been able to polymerize certain crotonic acid derivatives and to secure thereby novel products of high transparency which may be made fusible or substantially infusible as desired. I have found that the unsaturated esters of crotonic acid may be polymerized to form solid resinous products which are very clear and transparent. The products may be completely polymerized and in such cases are found to be substantially infusible and insoluble. On the other hand, polymerization may be interrupted before the insoluble polymer is formed and in this case, the polymer is found to be thermoplastic and is soluble in the usual solvents in which vinylic resins may be dissolved. Such polymers may be subjected to conditions under which the polymer is fused to form a substantially homogeneous product which may be molded or shaped and may be converted into the substantially insoluble and infusible state.

In order to obtain products of maximum hardness and to secure more complete polymerization of the crotonate, it is found desirable to polymerize the product in two stages. In the first stage, the monomeric crotonate may be polymerized as far as is convenient without conversion of the polymer to an infusible state. Such a polymer contains more or less residual monomer and if polymerization is continued, very often a soft gel-like product may be produced. To secure a more completely polymerized, harder material, it is found desirable to remove all or a substantial portion of the residual monomer prior to or during continued polymerization. Methods of accomplishing this result are hereinafter more fully set forth. This process is particularly adapted to the production of molded products. Very often it is found that if polymerization is continued to the point where the material solidifies, the material is in the form of a gel which is difficult to mold. However, by interrupting the polymerization and removing monomer as herein described the solid polymer which is obtained may be molded to suitable shapes and thereafter may be more completely polymerized.

Of particular interest are the resinous products which may be secured by polymerization of allyl or methallyl crotonates. However, other crotonic acid esters of other unsaturated alcohols such as vinyl alcohol, crotyl alcohol, propargyl alcohol, oleyl alcohol or linoleyl alcohol or ethylallyl alcohol or the corresponding halogen substituted alcohols such as 2-chloroallyl alcohol, etc., may be polymerized to form novel products having desirable properties.

I have found that when an unsaturated crotonate such as allyl crotonate, is polymerized, a soluble polymer is formed initially, but as polymerization proceeds, the insoluble polymer is produced and the mixture is converted to a non-reversible gel. Further polymerization of the gel results in the formation of a clear, hard, transparent resin. By interrupting polymerization in a suitable manner before the gel is formed, a soluble, fusible polymer may be secured. This fusible polymer is found to be soluble in a majority of the solvents in which the vinylic type polymers such as the polymers of the saturated acrylic esters are normally soluble. Upon heating, the fusible polymer may be converted to an infusible resin.

If desired, polymerization may be conducted in solution using a solvent in which the fusible polymer is soluble, such as acetone, dioxane, chloroform, toluene, benzene, carbon tetrachloride, methyl cellosolve acetate, phenyl cellosolve, dichlorethyl ether, xylene, tetralin, dibutyl phthalate, tetrachloroethylene, trichloroethylene, etc., or other solvents in which thermoplastic vinylic polymers are normally soluble.

Whenever the fusible polymer is desired, it is important that the polymerization be interrupted at the proper time and before the gel state is attained, and in general, it is interrupted shortly after the monomer becomes viscous. Polymerization may be halted by various means such as by lowering the temperature of the polymerization mixture to a suitable degree, for example, to room temperature or below. It has been found that although polymerization proceeds at a reasonable rate at temperatures of 80–100° C or above, particularly in the presence of catalysts, the reaction rate increasing with increase of temperature, it proceeds at such a slow rate that it may be practically discontinued at temperatures below 50° C. This is especially true when polymerization is carried out in solution.

In accordance with another effective method of interrupting polymerization, inhibitors, such as pyrogallol, hydroquinone, aniline, phenylene diamine, sulphur, thiophenol, organic or inorganic salts or complexes of the reduced forms of metals such as copper, manganese, cobalt, nickel, etc., dipentene, etc., may be added to the polymer during polymerization or before polymerization has been initiated. When a solution of the monomeric crotonate is polymerized, the polymerization may be stopped by precipitating and removing the polymer from the solution by suitable means such as by addition of a nonsolvent such as water or methyl or ethyl alcohol.

The following examples illustrate the preparation of these fusible polymers by polymerization in a solvent for the polymer.

Example I

One part by weight of allyl crotonate was heated with 0.22 part by weight of benzoyl peroxide and one part by weight of xylene under reflux for 24 hours. The resulting solution was carefully poured, with stirring, into 100 parts of methanol. A white precipitate which was fusible and soluble in acetone was formed. This material began to soften when heated to 75–90° C. and was a soft plastic mass at 120–140° C. However, prolonged heating caused loss of this plasticity, with the formation, first of an elastic, and then a hard, brittle product.

Example II 350 parts by weight of methallyl crotonate were heated with 77 parts by weight of benzoyl peroxide and 350 parts by weight of xylene at a temperature of about 150° C. for 25 hours. At this time, methanol was added to produce turbidity, and the resulting mixture was poured slowly, with stirring, into 1600 parts of methanol. The white precipitate thus formed was filtered and dried, and was soluble in acetone and chloroform and softened at 75–100° C. It was a highly plastic gum at 140–150° C., hardening with further heating.

It is also possible to produce the fusible polymer in accordance with my invention without resorting to the use of solutions of the monomer. Thus the monomer may be polymerized directly by use of heat and/or light preferably in the presence of catalysts such as air, ozone, oxygen, peroxides and the like and interrupting polymerization at the proper time. The polymerization proceeds without undue rapidity and the reaction may be stopped before the gel state is reached and generally when the monomer becomes viscous, by use of inhibitors or by cooling or by other convenient methods.

While the fusible polymer so produced may be molded or cast if desired and subsequently cured to the infusible state, it is found that considerable monomer may be retained by the polymer and that upon curing, considerable difficulty is encountered in securing complete or substantially complete polymerization of the residual monomer. This results in the production of soft gel-like structures which may be undesirable. The presence of residual monomer is particularly objectionable when it is in such concentrations as to render the mixture liquid. Since it is difficult to secure a uniformly fusible product when polymerization is allowed to proceed until the material solidifies at polymerization temperatures, usual practice is to interrupt polymerization when the mixture is fluid.

Accordingly, I have found that it is desirable to remove substantially all of the monomer prior to curing the polymer to its infusible state. In accordance with one convenient method the monomer may be distilled from the polymer by heating at a low temperature or by placing the fusible polymer under a vacuum or by extracting the monomer with a solvent in which the polymer is insoluble such as methyl or ethyl alcohol. Additionally, the polymer and monomer may be separated by dissolving the product in a solvent for both monomer and polymer and adding a nonsolvent to precipitate the fusible polymer. The following examples are illustrative of this phase of the invention.

Example III

A quantity of monomeric allyl crotonate was heated in a stream of air at a temperature of 150–160° C. until the liquid began to get viscous. The liquid was then dissolved in acetone and the fusible polymer was precipitated with methyl alcohol in the manner described in Example I. The precipitated polymer was recovered as a white gummy mass which dried to form a white acetone soluble powder. This powder fused readily at a temperature of 80° C.

Example IV

A quantity of monomeric allyl crotonate was heated in a stream of air at a temperature of 150–160° C. until the solution became viscous. The liquid was then cooled to room temperature and then distilled at an absolute pressure of 1 millimeter of mercury until a solid mass remained. This material was fused by heating to a temperature of 100° C. in a mold and was further cured at a pressure of 1500 pounds per square inch and a temperature of 150° C. for one hour. The article produced was hard, insoluble, clear, transparent and free from fractures.

Example V

A quantity of methallyl crotonate was heated with 3 percent by weight of benzoyl peroxide to a temperature of 160° C. until the solution became viscous. The polymer was recovered by dissolving the viscous solution in acetone and precipitating with methyl alcohol as in Example III. The polymer thus obtained softened at 75–100° C. On heating at 150° C. in the presence of benzoyl peroxide, it was converted into an infusible, insoluble resin.

The fusible polymers so produced have many characteristics which are similar to those of the polymers formed from the saturated acrylic acid esters. They are soluble in such organic solvents as acetone, dioxane, chloroform, ethyl cellosolve acetate, triacetin, phenyl cellosolve, etc., and soften upon heating. The exact softening points of the products are dependent to a great degree upon the temperature and catalyst concentration used during polymerization.

In accordance with my invention, I have found that upon subjection of these polymers to heating for a sufficient period of time, they are converted into infusible, insoluble, transparent, hard and wear-resistant products. Thus, while the fusible polymer melts or flows upon heating under non-polymerizing conditions and at atmospheric pressure, the converted infusible polymer retains its shape or contour and does not flow under such conditions, and in general, can not be molded. Occasionally, an infusible polymer may soften slibhtly without deformation upon heating at atmospheric pressure but often the polymer decomposes without visible softening. The conversion appears to occur at relatively low temperatures but is expedited by heating to the softening points of the polymers or above. This conversion appears to occur in the absence of catalysts. It may be assisted, however, by the incorporation of usual polymerization catalysts, such as oxygen, ozone, air, peroxides, such as hydrogen peroxide, benzoyl peroxide, basic or acidic catalysts, light, etc., by use of catalysts, it is found that the conversion of these products to the infusible state may be secured at lower temperatures. The application of super-atmospheric pressure has been found to assist the polymer to fuse or blend together whereby a strong substantially homogeneous product is secured. If desired, the conversion may be obtained by subjecting the fusible material to ultra-violet light in conjunction with or without heating.

The properties of the products so produced are dependent to a large degree upon the conditions under which they were rendered infusible. Thus, extremely hard, somewhat brittle products may be prepared by effecting the treatment at relatively high temperatures or under high pressures. On the other hand, somewhat stronger, less brittle more uniform materials may be secured when the treatment is carried under moderate pressures and temperatures sufficiently low to permit a slow conversion of the fusible polymer into its infusible stage through a period in which it is substantially completely molten.

By operation, in accordance wtih the present invention, it is thus possible to form a molded article from the fusible polymer such as the fusible polymeric allyl or the methallyl crotonate previously referred to, and thereupon to render the molded product insoluble and infusible by heat. In this manner, I am able to prepare transparent, hard, infusible molded products which have many of the desirable properties of the conventionally known thermoplastic resins. By proper regulation of the pressure and temperature, the fusible polymer may be extruded under such conditions that it becomes infusible as it leaves the extrusion die.

Since the fusible polymer is a true thermoplastic, it may be kept in the molten state for an indefinite period, particularly by incorporating an inhibitor such as hydroquinone whereby conversion to the infusible state may be prevented. It is thus possible to form cast or molded products by melting a quantity of the fusible polymer with a quantity of polymerization inhibitor in a suitable mold. These products may then be converted to the infusible state by introduction of catalysts. This may be done for example by heating the molded or cast material in a molten or solid state in the presence of air, peroxides, etc. In accordance with a further modification, the cast or molded thermoplastic polymer may be coated with a solution of catalyst or a film of monomer or a solution of fusible polymer which contains a high catalyst concentration may be applied to the surface of the molded product. This coated product may be subjected to polymerization with heat, pressure, and/or ultra-violet light to convert it to the infusible state.

In addition, it is possible to effect a conversion of the exterior of the plastic without completely converting the interior thereof to the infusible, insoluble state. Thus, cast or molded products, made from the fusible crotonates herein described, may be subjected to local surface heating whereby the surface is converted without complete conversion of the interior. In this manner, it is possible to secure integral products possessing a great flexibility and resiliency, the surfaces of which are extremely hard and insoluble. Similar products may be secured by increasing the catalyst concentration of the crotonate adjacent the surface thereof by suitable methods, for example, by application of a coating containing catalysts as described above. Similar products may be secured by incorporation of an inhibitor in the interior of the product or by varying the amount of plasticizer in the interior and exterior portions of the sheet whereby the interior converts to a flexible gel due to the presence of added plasticizer.

If desired, substantially infusible and insoluble polymers may be prepared directly without preparation of the intermediate polymer. Thus, the monomer or a partially polymerized syrup may be introduced into molds and the polymerization continued by use of heat, light and/or catalysts until the product has solidified and become substantially insoluble and infusible.

A large number of inert substances may be incorporated with the fusible polymer before subjecting to molding conditions. Suitable for such purposes are: fillers, such as wood-flour, mica, cotton flock, etc., plasticizers, such as dibutyl phthalate, dicyclohexyl phthalate, triacetin, tricresyl phosphate, natural and synthetic resins, pigments, including titanium dioxide, carbon black, chromic oxide, lead chromate, etc., and organic dyestuffs, such as methylene blue, methyl orange, etc.

If desired, similar products may be made from suitable copolymers of the unsaturated esters of the crotonic acid with the saturated esters of this acid, or with the esters of acrylic or alpha-substituted acrylic acids such as methyl, ethyl, propyl, butyl, allyl, methallyl or oleyl methacrylate or the corresponding acrylates or chloracrylates or vinyl halides or esters, such as vinyl chloride, vinyl acetate or styrene. In some cases, it is found that infusible products which are stronger and less brittle than the single polymer may be produced in this manner. This is particularly true when the allyl or other olefinic ester is polymerized with a saturated alcohol ester, such as the methyl or ethyl ester of acrylic, methacrylic or chloracrylic acid. While the relative proportion of materials used in the formation of copolymers may be varied it is preferred that the unsaturated crotonate should be present in such quantity that the polymer may be converted to the infusible state if desired. In general, it is preferred to use upward of 30 percent of the crotonate.

The polymers which I have prepared are capable of numerous uses, such as in lacquers or other coating compositions, molded articles, safety glass, etc. Where the composition is used for coating, it may be applied in solution or in solid form, either alone or in combination with natural or synthetic drying oils or resins and the like, the solvent removed and the coated article baked to render the surface infusible. In this manner, it is possible to surface other polymers which are less resistant to the action of solvents or of heat. When a coating of the fusible polymer of allyl or methallyl crotonate is deposited upon polymerized methyl methacrylate or similar polymer and the solvent removed, a coherent surface thereof is formed. Upon heating the coated article to suitable temperature, this surface may be made transparent, hard and infusible.

Being of the thermosetting type, these resins do not exhibit the phenomenon of "cold flow" after conversion to their infusible state and are thus especially desirable for such uses as airplane windshields, where the pressure differences have been found to bow thermoplastic glass substitutes, particularly at the higher altitudes. Coatings may also be applied to metal, glass, wood, synthetic resins, etc., surfaces by extrusion of the heated fusible polymer directly on the suitably-prepared surface. In similar manner, the surface may be heated and the polymer applied in powdered form, whereupon fusion occurs first to give a smooth, homogeneous film which may then be heat-hardened.

These resins are also suitable for many uses in the field of laminated products. For example, products of great strength, elasticity and adherence may be secured by converting fusible allyl or methallyl crotonate into the infusible state in the presence of a substantial amount of a compatible softening agent. Satisfactory non-shatterable glass sheets may be obtained by heating a combination of superposed sheets wherein the thermoplastic allyl crotonate polymer and a softening agent such as dibutyl phthalate are used as the adhesive layer.

It has been found that these products are applicable for impregnation purposes. Thus, leather, paper, wood or other comparatively porous substances may be steeped in a solution of the fusible polymer of crotyl crotonate, for example, and then heated alone, under pressure, or in the presence of catalysts to convert the absorbed polymer to the insoluble, infusible form. Greatly improved products, particularly in regard to strength, water-proofing, and electrical properties are obtained.

The following examples illustrate the conversion of the fusible resin into the infusible form:

Example VI

A portion of the fusible allyl crotonate polymer, prepared in accordance with Example III, was rendered molten by heating under slight pressure at 140° C. in a mold, and then converted to a clear, hard, infusible, and insoluble sheet by heating at 170° C. under a pressure of 5000 lbs. per sq. in. for one-half hour.

Example VII

A portion of fusible methallyl crotonate polymer, prepared as in Example V, was fused at 140–150° C., and then molded as in Example III, at 160–170° C. under pressure of 2000 lbs. per sq. in. for one hour. The product obtained was hard, clear, and unaffected by solvents or heat to the point of pyrolytic decomposition.

Example VIII

One part by weight of the fusible methallyl crotonate polymer was dissolved in 10 parts of acetone and the solution applied to the surface of a cast sheet of polymerized methyl methacrylate. Upon evaporation of the solvent, a clear film was obtained. This product was heated at 140–150° C. for one hour and a material having a comparatively soft interior and a surface which was transparent, hard and resistant to the action of heat and solvents was produced.

The process may also be extended to the production of mixed polymers of copolymers. Thus, the fusible polymer prepared in accordance with my invention may be mixed with other monomers or polymers such as monomeric or polymeric methyl methacrylate, methyl chloracrylate, allyl methacrylate, allyl methacrylate, methallyl methacrylate, vinyl acetate, vinyl chloride, styrene, etc., and the mixture subjected to conditions of polymerization.

Products having a wide range of characteristics may be produced by regulation of polymerization conditions. The crotonate polymers may be prepared in an extremely flexible form by incorporating a substantial amount of various plasticizers such as ethyl, methyl, butyl, or benzyl phthalates, esters of polyhydric alcohols, such as glycol dilaurate, glycerol triacetate, etc., substituted naphthalene, such as the alkyl-naphthalenes, amyl naphthalene, propyl naphthalene, etc., chlorinated aromatics such as chlorinated diphenyl, chlorinated naphthalene, etc., in the polymer prior to polymerizing to an infusible state. In this manner, it is possible to produce products having a flexibility and elasticity at normal temperatures which are comparable to that of rubber.

Although the present invention has been described with reference to the specific details of certain embodiments thereof, it is not intended that such details shall be regarded as limitations upon the scope of the invention except insofar as included in the accompanying claims.

I claim:

1. A resinous polymer of oleyl crotonate.

2. In a method of preparing a substantially infusible insoluble polymer the steps which comprise polymerizing an unsaturated alcohol ester of crotonic acid, interrupting polymerization after substantial polymerization has occurred but before the polymer is converted to a gel, substantially completely separating residual monomer from the resulting fusible polymer before the polymer is polymerized to an infusible state, subjecting the resulting polymer to a temperature and pressure sufficient to insure the existence of the polymer in a fused state and continuing polymerization of the fused polymer for a time sufficient to convert the polymer into a substantially infusible insoluble state.

3. The process of claim 2 wherein the ester is oleyl crotonate.

4. The process of claim 2 wherein the ester is methallyl crotonate.

5. The process of claim 2 wherein the ester is allyl crotonate.

6. The process of claim 2 wherein the ester is polymerized in the presence of a polymerization inhibitor.

7. The process of claim 2 wherein the polymer is fused in the presence of a polymerization inhibitor.

8. In a method of preparing a substantially infusible insoluble polymer the steps which comprise polymerizing an unsaturated alcohol ester of crotonic acid, interrupting polymerization after substantial polymerization has occurred but before the polymer is converted to a gel, substantially completely separating residual monomer from the resulting fusible polymer before the polymer is polymerized to an infusible state, subjecting the resulting polymer to a temperature and pressure sufficient to insure the existence of the polymer in a fused state and continuing polymerization of the fused polymer in the presence of a polymerization catalyst for a time sufficient to convert the polymer into a substantially infusible insoluble state.

MAXWELL A. POLLACK.